J. H. HAMMOND, Jr.
RADIODYNAMIC CONTROL OF GYROSCOPES.
APPLICATION FILED AUG. 14, 1913. RENEWED JULY 11, 1917.
1,418,790.
Patented June 6, 1922.
2 SHEETS—SHEET 1.
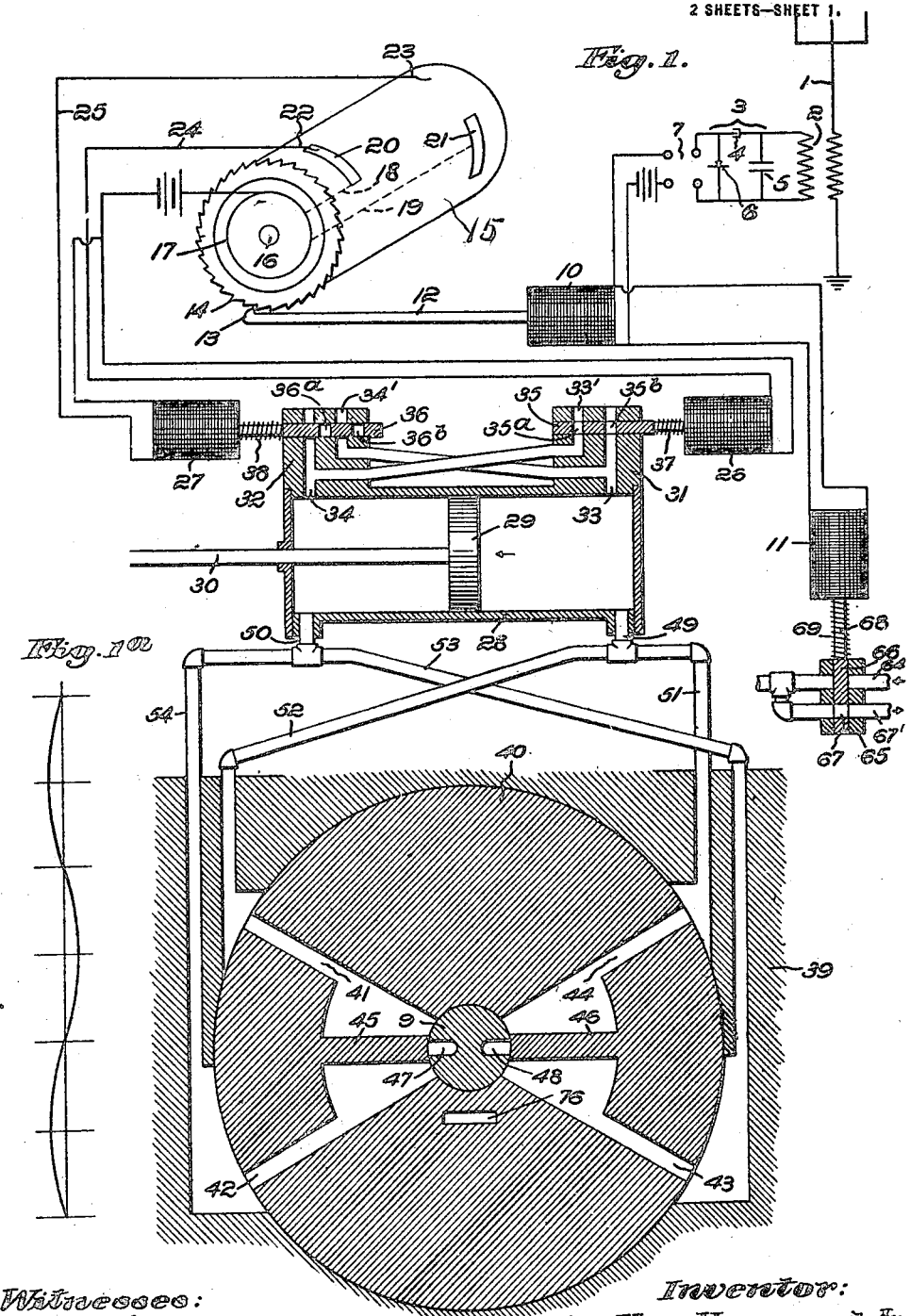

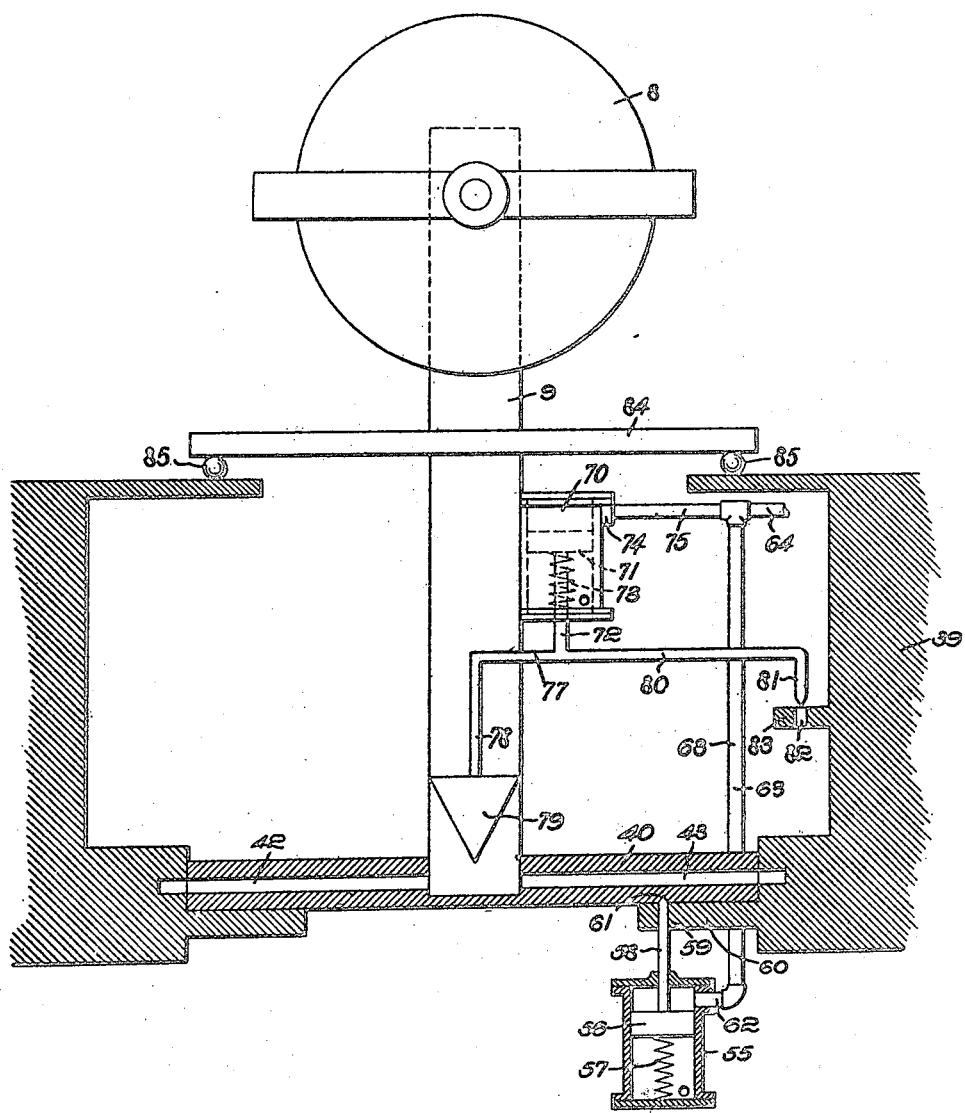

UNITED STATES PATENT OFFICE.

JOHN HAYS HAMMOND, JR., OF GLOUCESTER, MASSACHUSETTS.

RADIODYNAMIC CONTROL OF GYROSCOPES.

1,418,790.  Specification of Letters Patent.  Patented June 6, 1922.

Application filed August 14, 1913, Serial No. 784,691. Renewed July 11, 1917. Serial No. 180,021.

*To all whom it may concern:*

Be it known that I, JOHN HAYS HAMMOND, Jr., a citizen of the United States, and a resident of Gloucester, in the county of Essex and State of Massachusetts, have invented an Improvement in Radiodynamic Control of Gyroscopes, of which the following description, in connection with the accompanying drawings, is a specification, like characters on the drawings representing like parts.

This invention relates to the control of moving bodies at a distance by radiant energy.

In order that the principle of the invention may be readily understood, I have disclosed a single embodiment thereof in the accompanying drawings, wherein—

Fig. 1 is a view partially in transverse section and partially diagrammatic and in plan, of one form of apparatus for practicing my invention;

Fig. 1ª is a diagrammatic representation of the gyroscopic creep, and

Fig. 2 is a view, partially in vertical section and partially in elevation, of a portion of the apparatus shown in Fig. 1.

In order to control moving bodies at a distance by radiant energy, such, for example, as vessels, it has, prior to the invention disclosed by me in my co-pending application Serial No. 777,828, filed July 14, 1913, been necessary that the operator shall at all times be in touch with and constantly exercising control of the mechanism on board the vessel or other moving body which he is governing. In practice, and particularly in controlling the course of a torpedo or other moving vessel by radiant energy, I have found that prior to the invention disclosed in my said application, there has been a constant need of sending signals in order to rectify the errors in the course of such vessels due to wave, wind, current and other phenomena. In said application I disclosed a controller, preferably a gyroscope, which I employed to keep the vessel on a fixed, definite or predetermined course, except at such times as the operator desired to change the course, and thereupon modified the action of the gyroscope upon the vessel. I thereby obviated the necessity of constant wave emission from the control station for the purpose of compensating for deviations from a straight course due to the phenomena previously referred to or other causes, and thereby greatly minimized the possibility of the enemy determining the wave lengths used in the control of the torpedo or other vessel, and thereupon interfering with the control thereof. In the present application, I have disclosed improved means for varying or modifying the control of the vessel or other moving body by the controller, herein typified as a gyroscope, and have disclosed one embodiment of means for compensating for any creep that may occur in the gyroscope.

Referring to the drawings wherein I have shown a single embodiment of means for carrying out my invention and wherein I have typified the moving body as a vessel,—preferably as torpedo boat, but which may be a land or air vehicle or appliance, such, for example, as an aeroplane, I have indicated the open receiving oscillatory circuit at 1, this being connected to the winding 2 of a closed oscillatory circuit 3 having therein a stopping condenser 4, a condenser 5 and any suitable detector 6 for electrical oscillations. At 7 I have represented a sensitive relay or other contact making device. These parts may be of any suitable construction, not herein necessary more fully to describe or to indicate.

The controller preferably employed by me is a gyroscope, and I have diagrammatically represented the same at 8 in Fig. 2. The shaft or rod 9 of the gyroscope is normally maintained fixed in space thereby, and I employ suitable means operated through the instrumentality of the receiving circuits 1 and 3 for modifying or varying the action of the gyroscope upon the vesssel and for effecting other objects relative to the gyroscopic control of the vessel, which will be hereinafter more fully set forth. In the disclosed embodiment of means for effecting these results, I have represented at 10 and 11 two solenoids which are adapted to be energized through the relay 7 controlling the circuit wherein said solenoids are positioned.

The plunger 12 of the solenoid 10 is provided with a pawl or toothed formation 13 adapted when the solenoid 10 is energized to engage circumferential teeth 14 upon a commutator, diagrammatically indicated at 15, and which is mounted for rotation upon a suitable shaft 16 having bearings in the hull of the vessel. Upon the commutator I provide a conducting band or ring 17 suitably insulated and which is connected by wires 18 and 19 with segments 20 and 21. The said segments are so positioned as alternately and respectively to make contact upon the rotation of the commutator, with brushes 22 and 23 which are respectively connected by wires 24, 25 to solenoids 26 and 27, and which may be positioned in a second relay circuit. Therefore, upon the receipt of a wave emission from the control station, the solenoid 10 is energized so as to energize either the solenoid 26 or the solenoid 27, and through the operation of suitable instrumentalities to turn the vessel to starboard or to port. At the same time, the solenoid 11 is energized to admit motive fluid from any suitable source of supply to the shaft or rod of the gyrosope 8. For this purpose, I have herein represented a cylinder 28 having therein a piston 29, the plunger 30 whereof is connected to the steering mechanism of the vessel and forms a portion of the rudder means. The opposite ends of the cylinder 28 with valve casings 31, 32 provided with admission ports 33, 34 communicating with any suitable reservoir or source of compressed air or other motive fluid and with exhaust ports 33′, 34′, said admission and exhaust ports being controlled by valves 35, 36, which are formed with or operatively connected to the plungers 37, 38 of the solenoids 26, 27. Said valves are respectively provided with ports 35ª, 35ᵇ and 36ª, 36ᵇ.

In the manner described or in any other suitable manner, the vessel is turned to starboard or to port upon the receipt of wave emissions from the control station. In order, however, to obviate the necessity of constant wave emission to keep the vessel upon its course, I have provided a controller, herein typified as a gyroscope, and have provided suitable means whereby upon deflection of the vessel from its true course compressed motive fluid is, through the instrumentality of the said gyroscope, admitted to the cylinder 28 upon the proper side of the piston 29, so as to turn the vessel sufficiently to starboard or to port to return it to its true course.

The hull of the vessel is indicated at 39 in Figs. 1 and 2. Upon the hull but independent thereof, and also of the gyroscope rod or shaft 9, I have mounted a ported member herein represented as a disk 40 of any suitable size. The said disk is provided with ports or passages 41, 42, 43 and 44 leading from the center thereof to the periphery, and preferably enlarged at their inner ends, as indicated in Fig. 1, so as to provide relatively narrow separating walls 45 and 46. The rod or shaft 9 of the gyroscope is provided with an intake pipe 47, by which motive fluid under pressure may be admitted from any suitable source, and with an exhaust passage 48 leading to any suitable point of discharge. The intake 47 is connected to any suitable source of supply (not shown) and which is preferably compressed air.

I provide suitable passages for establishing communication between the cylinder 28 and the ports 41, 42, 43, 44 of the disk 40. Herein for the purpose I have represented the cylinder as provided at its opposite ends with ports 49, 50. The port 49 is in communication by passages 51 with the port 44 of the disk 40 and by passage 52 with the port 41 of said disk. The port 50 of the cylinder 28 is in communication by passage 53 with the port 43 of the disk 40 and by passage 54 with the port 42 thereof, so that upon rotation of the disk 40 in either direction by movement of the vessel, the intake and exhaust passages 47, 48 in the shaft or rod of the gyroscope will be placed in communication with the passages 41 and 43 or with the passages 42 and 44, so as to admit motive fluid to one end or the other of the said cylinder 28 and to permit the motive fluid to be exhausted from the opposite end of said cylinder, thus moving the piston 29 to the right or to the left as the case may be and deflecting the vessel toward starboard or toward port.

Normally the disk 40 is locked to the hull of the vessel by suitable means, so that as the vessel deviates to the right or to the left the disk 40 is correspondingly turned to bring the ports thereof into register with the intake and exhaust passages in the gyroscope rod, and thereupon to effect the rectification of the course of the vessel. So long as the vessel maintains its true course, the walls 45, 46 of the disk 40 are opposite the intake and exhaust passages 47, 48 of the gyroscope rod 9, and it will be observed that the said walls are relatively thin, so that very slight or minimum movement of the vessel to starboard or to port will result in such displacement of the walls 45, 46 as to open the passages 47 and 48 to the proper ports 41, 42, 43, 44 of the disk 40.

While I may employ any suitable means for locking the disk 40 to the hull, I have in Fig. 2 represented a cylinder 55 having therein a piston 56 normally pressed upward by the coiled spring 57 and provided with a plunger 58 passing through a hole or perforation 59 in the portion 60 of the hull and into a socket 61 in the under face of the disk 40. Above the piston 56 the cylinder 55 is provided with a port 62 which is connected by passages 63, 64 to some suitable source of motive fluid supply, and preferably air under pressure. As shown in Fig. 1, the passage 64 is provided at some suitable point with a valve casing 65 having therein a valve 66 provided with an admission port 67 which may be placed in register with the passage 64 or with an exhaust extension 67' thereof. The said valve is formed with or operatively connected to the plunger 68 of the solenoid 11, so that upon energization of the latter the valve 66 is moved against the stress of the coiled spring 69, so as to bring the admission port 67 of said valve into register with the passage 64 and thus to place said passage in open communication with said source of fluid supply, thus admitting said motive fluid into the cylinder 55 above the piston 56 thereof, forcing said piston downwardly against the stress of the spring 57 and withdrawing the plunger 58 of said piston from the socket 61 of the disk 40. In this manner, the said disk 40 is released from the hull, so that it is no longer turned by deviating movements of the latter.

I contemplate connecting the gyroscope to the hull of the vessel or other moving body upon release of the disk 40 from the hull, and preferably the release of the said disk from the hull and the engagement of the gyroscope and the hull are effected simultaneously. Therefore, I terminate the functioning of the gyroscope by connecting it to the hull, at the time that the control of the gyroscope upon the vessel is terminated. Thereupon the vessel may be controlled from the distant sending station, and when the functioning of the gyroscope is to be resumed, the gyroscope is released from the hull and the disk 40 is again locked to the hull. While these results may be secured in any suitable manner, I have disclosed the preferred embodiment of means for effecting the result.

Suitably attached to the gyroscope rod 9 is a cylinder 70 having therein a piston 71 provided with a plunger 72 extending through the lower head of said cylinder. Surrounding said plunger within the cylinder is a coiled spring 73 which normally holds said piston elevated. Above the said piston, the cylinder 70 is provided with a port 74 which is in communication by a passage 75 with the passage 64 so that when the admission port 67 in valve 66 is moved into register with the said passage 64 upon energization of the solenoid 11, the compressed motive fluid is admitted not only into the cylinder 55, so as to force the piston 56 thereof downwardly, but also into the cylinder 70 so as to force the piston 72 thereof downwardly against the tension of its spring 73.

I have provided suitable means herein associated with the cylinder 70 and operated through its connection with the compressed motive fluid supply, positively to maintain the walls 45, 46 of the disk 40 opposite the intake and exhaust passages 47, 48 of the gyroscope rod at the times the disk 40 is disconnected from the hull of the vessel, in order to prevent the admission and exhaust of motive fluid to and from the cylinder 28 through the instrumentality of the gyroscope at such times. When the disk 40 is disconnected from the hull and the vessel is therefore no longer under the control of the gyroscope, motive fluid is admitted to the cylinder 28 only through the ports 33 and 34, so that the vessel is turned to starboard or to port by reason of the wave impulses transmitted from the distant control station.

In order thus to hold the disk 40 in fixed relation to the gyroscope, and therefore to prevent the admission of motive fluid to or its exhaust from the cylinder through the passages 47, 48 of the gyroscope, I have herein represented the said disk as provided with a short slot 76 in its upper face at a suitable distance from its center, and I have represented the plunger 72 as forked, the member 77 thereof being downwardly bent as indicated at 78 and provided at its lower free end with a wedge 79 adapted to penetrate the slot 76. The member 80 of the said plunger 72 is provided with a downturned end 81 adapted to enter a hole or perforation 82 in a ledge or projection 83 of the hull 39.

When the piston 71 is forced downwardly, the wedge 79 enters the slot 76 and the downwardly extending end 81 enters the hole in the hull, thereby locking the gyroscope to the hull and also holding the disk 40 in such position that its walls 45 and 46 close the intake and exhaust passages 47, 48 of the gyroscope rod. In this position of the parts, the gyroscope no longer controls the vessel since its gyroscopic function has been neutralized or temporarily terminated by reason of the fact that it is locked to the hull. At such time, therefore, the gyroscope, which I have herein represented as provided with a disk 84 rotating upon ball bearings 85, will rotate out of its normal azimuth. Inasmuch, therefore as the gyroscope is locked to the hull and no longer controls the vessel, the latter is subjected to the control of the operator at the distant station, and upon the receipt of wave impulses by the receiving circuits 1 and 3, the vessel is turned to starboard or to port, as the case may be.

I have discovered that there is a tendency of the gyroscope during the time it is functioning to creep in one direction or the other. That is to say, there is a slight oscillation of the gyroscope from its true azimuth—north and south—due mainly to the slight mistakes in the original setting. This causes a complete oscillation of the gyroscope about every four hours. This oscillation can be reduced to one degree or less, and the longer the gyroscope is run, the less becomes the oscillation. In Fig. 1ª, I have graphically indicated by curve the oscillation or creep of the gyroscope. This results in slight rotative movement of the rod 9 relative to the disk 40, thereby opening the intake and exhaust passages 47, 48 thereof at times when no rectification of the course of the vessel is required. I overcome this objection and compensate for the creep of the gyroscope which has occurred during its functioning, by causing the wedge 79 to enter the slot 76 of the disk 40, thus turning the said disk in a clockwise or contraclockwise direction so as to bring its walls 45, 46 in register with and to close the intake passage 47 and the exhaust passage 48 of the gyroscope rod, and therefore to maintain them closed during the periods that the gyroscope is locked to the hull. The creep of the gyroscope has thus been compensated for and corrected at the time the functioning of the gyroscope is temporarily terminated and the vessel is subjected to the control of the operator at the distant sending station.

At such times, therefore, as the operator at the distant control station is sending wave impulses, the gyroscope is locked to the hull, and the disk 40 is held in such relation to the passages 47, 48 of the gyroscope rod that motive fluid cannot be admitted through the instrumentality of the gyroscope to the cylinder 28. Therefore the piston 29 of said cylinder 28 is moved toward the right or toward the left solely through the admission of motive fluid through the intake passages 33, 34.

Upon the termination of the wave impulses, the energization of the solenoids 11, 26, 27 ceases, whereupon the valve 66 through the instrumentality of the spring 69 closes the passage 64 to the admission port 67 and places it in register with the exhaust extension 67 thereof. Thereupon the motive fluid is exhausted through the pipes 63, 75 from the upper ends of the cylinders 55, 70, and the spring 57 projects the plunger 58 into the engagement of the socket 1 with the disk 40, thereby again locking the disk to the hull, and the spring 73 lifts the piston 71 so as to withdraw the wedge 79 from the slot 76 and to withdraw the projection 81 from the hole or socket 82 of the hull. The gyroscope is thus unlocked or released from the hull, and it is permitted to resume its normal function and to maintain the vessel upon its predetermined or fixed course.

When the disk 40 is locked to the hull, it turns with the hull and thus the fluid under pressure is admitted through the passages in said disk 40 as it and the vessel turn about the rod 9 of the gyroscope, which remains fixed in place. The gyroscope now functions in its accustomed or proper manner. When, however, the plunger 58 is released from the disk 40, then the gyroscope is clutched to the hull at 81, 82, 83, and cannot then function as a gyroscope. The gyroscope is then turned by and with the hull and no longer controls the admission of fluid under pressure into the cylinder 28. At such time,—that is, when the gyroscope is clutched to the hull,—the gyroscope is clutched to the disk by the plunger 79. This, however, is for the purpose of turning the disk 40 with the rod 9 of the gyroscope in order to prevent fluid under pressure being admitted through tube 9 into the cylinder 28. This is done because at this time fluid under pressure is admitted to cylinder 28 not by the gyroscope, but by radiant energy through the action of solenoids 26, 27.

Thus the plunger 58 clutches the disk 40 to the hull, but the wedge 79 clutches the gyroscope to the disk 40, and this latter is done at the time when the gyroscope is not functioning as a gyroscope, but is clutched to the hull.

I do not by the construction herein disclosed compensate for the creep of the gyroscope by returning the gyroscope to its absolutely proper position, but I correspondingly turn the disk 40 by an amount equal to the error of the gyroscope. The fault occurring through creep of the gyroscope is that it would or might eventually move the intake and exhaust passages 47, 48 of the gyroscope rod 9 out of register with the walls 45, 46 at a time when this is not required to keep the vessel on its course. This difficulty or danger is overcome or prevented by correspondingly moving the disk 40 through the action of the wedge 79. It will be observed, viewing Fig. 1, that it is important to preserve the normal closed relation of the intake and exhaust passages 47, 48 of the gyroscope rod 9 with the walls 45, 46 of the disk 40. To do this, it is not necessary to restore the gyroscope to its true position. It may and preferably is done by turning the disk 40 to compensate for the described error in the movement of the gyroscope. Such error, owing to creep of the gyroscope, is generally small, and the socket 61 is large enough in diameter to receive the point of the plunger 58 in the compensated position of the disk 40, or if desired the disk 40 may be provided with a plurality of sockets, as disclosed in my co-pending application Serial No. 778,828.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A system for controlling the operation of moving bodies at a distance by radiant energy including in combination, a vessel to be propelled having a gyroscope to impart thereto a predetermined or definite direction of movement, a ported member having movement relative to the vessel and the gyroscope, means to lock said member to said vessel, means responsive to radiant energy from a distance to unlock said member and vessel, and co-acting means to compensate for creep of the gyroscope.

2. A system for controlling the operation of moving bodies at a distance by radiant energy including in combination, a vessel to be propelled having a gyroscope to impart thereto a predetermined or definite direction of movement, and provided with in-take and exhaust passages, a ported member having movement relative to the vessel and said gyroscope, means to lock said member and vessel together, means responsive to radiant energy from a distance to unlock said member and vessel, and means responsive to radiant energy from a distance to maintain the ports of said member out of alignment with the in-take and exhaust passages of the gyroscope when said member is unlocked from the hull.

3. A system for controlling the operation of moving bodies at a distance by radiant energy including in combination, a vessel to be propelled having a gyroscope to impart thereto a predetermined or definite direction of movement and having intake and exhaust passages for motive fluid, a ported member adjacent to said gyroscope and having movement relative thereto and to the vessel, and means responsive to radiant energy from a distance to prevent register of said passages and ports due to creep of the gyroscope.

4. A system for controlling the operation of moving bodies at a distance by radiant energy including in combination, a vessel to be propelled having a gyroscope to impart thereto a predetermined or definite direction of movement and having intake and exhaust passages, a member adjacent said gyroscope and having movement relative thereto and to said vessel, means to lock said vessel and member together, and means responsive to radiant energy from a distance to unlock said vessel and member and to lock together the vessel and gyroscope.

5. A system for controlling the operation of moving bodies at a distance by radiant energy including in combination, a vessel to be propelled having a gyroscope to impart thereto a predetermined or definite direction of movement and having intake and exhaust passages, a member adjacent said gyroscope and having movement relative thereto and to said vessel, means to lock said vessel and member together, and means responsive to radiant energy from a distance to unlock said vessel and member and to lock together the vessel and gyroscope and to compensate for creep of the gyroscope.

6. A system for controlling the operation of moving bodies at a distance by radiant energy including in combination, a vessel to be propelled having a gyroscope to impart thereto a predetermined or definite direction of movement, a gyroscope rod having intake and exhaust passages for motive fluid, a member surrounding said rod and having a series of ports, means responsive to radiant energy from a distance to neutralize the action of said gyroscope, and means to prevent communication between said passages and ports during the period of neutralization of said gyroscope.

7. A system for controlling the operation of moving bodies at a distance by radiant energy including in combination, a vessel to be propelled having a gyroscope to impart thereto a predetermined or definite direction of movement, a gyroscope rod having intake and exhaust passages for motive fluid, a ported member surrounding said rod and having movement relative thereto, said ports being positioned to effect communication between the same and said passages upon slight movement of said member.

8. A system for controlling the operation of moving bodies at a distance by radiant energy including in combination, a vessel to be propelled having a gyroscope to impart thereto a predetermined or definite direction of movement, a gyroscope rod having intake and exhaust passages for motive fluid, a ported member surrounding said rod and having movement relative thereto, said ports being arranged in pairs to communicate respectively with said intake and exhaust passages, the ports of each pair of ports being narrowly spaced, to effect communication with said passages upon slight movement of said member.

9. A system for controlling the operation of moving bodies at a distance by radiant energy including in combination, a vessel to be propelled having a gyroscope to impart thereto a predetermined or definite direction of movement, motive fluid supply means controlled by said gyroscope, means responsive to radiant energy from a distance to neutralize the action of said gyroscope, and co-acting means to prevent functioning of said motive fluid supply means during the period of neutralization of said gyroscope.

10. A system for controlling the operation of moving bodies at a distance by radiant energy including in combination, a vessel to be propelled having a gyroscope to impart thereto a predetermined or definite direction of movement, motive fluid supply means controlled by said gyroscope, means responsive to radiant energy from a distance to neutralize the action of said gyroscope, and co-acting means also responsive to radiant energy from a distance to prevent functioning of said motive fluid supply means during the period of neutralization of said gyroscope.

11. A system for controlling the operation of moving bodies at a distance by radiant energy including in combination, a vessel to be propelled having a gyroscope to impart thereto a predetermined or definite direction of movement and having intake and exhaust passages, a member adjacent said gyroscope and having movement relative thereto and to said vessel, means to lock said vessel and member, and means responsive to radiant energy from a distance to disengage said vessel and member and to engage said vessel and gyroscope.

12. A system for controlling the operation of moving bodies at a distance by radiant energy including in combination, a movable body having a gyroscope to impart thereto a predetermined or definite direction of movement, motive fluid supply means controlled by said gyroscope, means responsive to radiant energy from a distance to neutralize the action of said gyroscope, and co-acting means to prevent functioning of said motive fluid supply means during the period of neutralization of said gyroscope.

13. A system for controlling the operation of moving bodies at a distance, including in combination, a body to be propelled provided with means to maintain a predetermined or definite direction of bodily movement, and means controlled from a distance and carried by and movable with respect to said direction maintaining means to compensate for errors in the latter.

14. A system for controlling the operation of moving bodies at a distance including in combination, a body to be propelled provided with a controller to maintain a predetermined or definite direction of bodily movement, rudder means acted upon by said controller, thereby to maintain said predetermined direction of bodily movement, and means carried by said controller and movable with respect thereto in response to radiant energy to compensate for errors of said controller, and thereby to prevent movement of said rudder means through the controller due to errors of said controller.

15. A system for controlling the operation of moving bodies at a distance by radiant energy including in combination, a body to be propelled provided with a controller to maintain a predetermined or definite direction of bodily movement thereof, rudder means governed by said controller, and means carried by said controller and movable with respect thereto to prevent errors of said controller from effecting said rudder means.

16. A system for controlling a dirigible body, including in combination a body provided with means for maintaining said body upon a predetermined course, said means including two elements separately rotatable about a common axis with respect to said body, one of said elements being normally held against rotation in space with respect to said axis, and the other of said elements being normally held against rotation about said axis with respect to said body.

17. A system for controlling a dirigible body, including in combination a body provided with means for maintaining said body upon a predetermined course, said means including two elements separately rotatable about a common axis with respect to said body, one of said elements being normally held against rotation in space with respect to said axis, and the other of said elements being normally held against rotation about said axis with respect to said body and means controlled by radiant energy for modifying the functioning of said first named element.

18. A system for controlling a dirigible body, including in combination a body provided with means for maintaining said body upon a predetermined course, said means including two elements separately rotatable about a common axis with respect to said body, one of said elements being normally held against rotation in space with respect to said axis, and the other of said elements being normally held against rotation about said axis with respect to said body and means controlled by radiant energy for moving said second named element about said axis with respect to said body.

19. A system for controlling a dirigible body, including in combination a body provided with means for maintaining said body upon a predetermined course, said means including two elements separately rotatable about a common axis with respect to said body, one of said elements being normally held against rotation in space with respect to said axis, and the other of said elements being normally held against rotation about said axis with respect to said body and means responsive to radiant energy for modifying the action of said first named element, and means responsive to radiant energy for rotating said second named element about said axis with respect to said body.

20. A system for controlling a dirigible body, including in combination a body provided with means for maintaining said body upon a predetermined course, said means including two elements separately rotatable about a common axis with respect to said body, one of said elements being normally held against rotation in space with respect to said axis, and the other of said elements being normally held against rotation about said axis with respect to said body and means responsive to radiant energy for holding said first named element against rotation about said axis with respect to said body and for simultaneously rotating said second mentioned element about said axis with respect to said body.

21. The combination with two elements separately rotatable about a common axis, and means responsive to radiant energy for holding one of said elements against rotation and simultaneously rotating the other of said elements about said axis.

22. The combination with a plurality of elements separately rotatable about a common axis, and means responsive to radiant energy for holding one of said elements against rotation and rotating another of said elements about said axis.

23. The combination with a plurality of elements separately rotatable upon a common axis, and means responsive to radiant energy for holding one of said elements against rotation and simultaneously rotating another of said elements about said axis.

In testimony whereof, I have signed my name to this specification, in the presence of two subscribing witnesses.

JOHN HAYS HAMMOND, Jr.

Witnesses:
FITZ J. BABSEN,
JOHN CUNNINGHAM.